United States Patent [19]

Maeda

[11] 4,324,868
[45] Apr. 13, 1982

[54] PROCESS AND APPARATUS FOR PREPARATION OF VINYL POLYMERS

[75] Inventor: Toru Maeda, Toyama, Japan

[73] Assignee: Mitsubishi Rayon Co., Ltd., Tokyo, Japan

[21] Appl. No.: 160,194

[22] Filed: Jun. 17, 1980

[30] Foreign Application Priority Data

Jun. 19, 1979 [JP] Japan .............................. 54-83727[U]
Jun. 25, 1979 [JP] Japan .................................. 54-80000

[51] Int. Cl.³ .............................................. C08F 20/14
[52] U.S. Cl. .......................................... 525/54; 526/67; 526/329; 526/329.7; 526/342
[58] Field of Search ............................. 525/54; 526/67

[56] References Cited

U.S. PATENT DOCUMENTS 3,551,396 12/1970 Lanthier ................................. 526/67
3,821,330 6/1974 Free ................................ 260/89.5 A
3,900,453 8/1975 Shimada et al. ................ 260/86.1 E
3,954,722 5/1976 Echte et al. ............................ 526/67
3,968,059 7/1976 Shimada et al. ....................... 526/68
4,209,599 6/1980 Brady et al. ........................... 526/67
4,243,781 1/1981 Kent ...................................... 526/67

Primary Examiner—Harry Wong, Jr.
Attorney, Agent, or Firm—Oblon, Fisher, Spivak, McClelland & Maier

[57] ABSTRACT

A process and apparatus for preparing vinyl polymers by continuous bulk or solution polymerization provide improved mixing during polymerization. In the process, fresh polymerization starting material is incorporated into a part of reaction mixture withdrawn from a polymerization zone and then fed to the polymerization zone. Polymerization temperature is kept at 100° to 200° C. and polymer content in a reaction mixture withdrawn from the polymerization zone is kept at 50 to 80% by weight. A tank having agitating means, outlet opening and recycling inlet is used as polymerization reactor. Said recycling inlet is preferably located at a position corresponding to ¼ or less of the total height from the bottom to the top of the tank.

5 Claims, 6 Drawing Figures

PROCESS AND APPARATUS FOR PREPARATION OF VINYL POLYMERS

BACKGROUND OF THE INVENTION

1. Field of the Invention

The present invention relates to a process for the preparation of vinyl polymers by bulk or solution polymerization and an apparatus for practicing this process. More particularly, the present invention relates to a process for preparing vinyl polymers using a reaction vessel of the complete mixing type, in which polymerization is carried out while a portion of the polymer-containing liquid is withdrawn from the reaction vessel and recycled to the polymerization starting material. The invention also relates to apparatus for practicing this process.

2. Description of the Prior Art

The technique of preparing vinyl polymers, for example, methyl methacrylate polymers, by bulk or solution polymerization is superior to the conventional suspension polymerization technique in that there is no need for waste water treatment and the polymerization can be conducted continuously with ease. However, this process has the drawback that if the polymerization ratio, i.e., the ratio of the formed polymer to the starting monomer, is increased, the viscosity of the polymerization mixture increases drastically and consequently, in order to remove heat of polymerization and handle the reaction mixture satisfactorily, special measures have to be taken, resulting in increased equipment cost. Especially in bulk polymerization of methyl methacrylate an acceleration of the polymerization known as the "gel effect" occurs; and if the viscosity of the polymerization mixture is high, it becomes difficult to control the polymerization. In order to eliminate this disadvantage, a method has recently been proposed in which the viscosity of the polymerization mixture is reduced and the monomer is polymerized at a relatively low polymerization ratio (see Japanese Patent Publication No. 32665/77, U.S. Pat. No. 3,900,453 and U.S. Pat. No. 3,968,509). This polymerization process is of the complete mixing type in which the reaction mixture in the reaction zone is agitated and substantially homogeneously mixed, and the reaction is carried out while maintaining reaction conditions such as the reaction temperature, the initiator concentration, the polymerization regulator concentration, the polymerization ratio and the viscosity of the reaction mixture at substantially constant levels. Accordingly, in continuous polymerization of this complete mixing type, fresh monomer containing a polymerization inhibitor and a polymerization regulator, which is continuously introduced, should be mixed promptly and homogeneously with the reaction mixture in the reaction vessel.

However, in order to increase the manufacturing rate, the viscosity of the reaction mixture in the reaction vessel of the complete mixing type is increased to a level of scores of poises to several thousand poises. On the other hand, the viscosity of the monomer containing polymerization initiator and polymerization regulator is as low as about 0.01 poise. Accordingly, various problems arise because of the great difference in viscosity. For example, the efficiency of mixing and agitation is lowered and good reaction control cannot be attained. Furthermore, the polymer concentration is non-uniform because of insufficient mixing, resulting in formation of a heterogeneous polymer of lower quality.

Hence, a need has continued to exist for a method of carrying out continuous polymerization of vinyl monomers which provides efficient polymerization combined with good control of the reaction conditions for production of high quality polymer.

SUMMARY OF THE INVENTION

Therefore, it is an object of this invention to provide a method for continuous bulk or solution polymerization of vinyl monomers.

A further object is to provide a method of continuous bulk or solution polymerization of vinyl monomers wherein the reaction conditions can be easily controlled.

A further object of the invention is to provide apparatus for continuous bulk or solution polymerization of vinyl monomers under carefully controlled reaction conditions.

Further objects of the invention will be apparent from the description of the invention which follows.

Accordingly, after research and investigation, it was found that the deficiencies of hitherto known methods for continuous bulk or solution polymerization of vinyl monomers can be overcome by the following polymerization process.

According to the fundamental principle of this invention, the process for preparing vinyl polymers by bulk or solution polymerization comprises continuously introducing a polymerization starting material, which contains a vinyl monomer and a polymerization initiator, into a polymerization zone, polymerizing the monomer within the polymerization zone while mixing the reaction mixture within the polymerization zone and maintaining the temperature of the polymerization mixture between 100° and 200° C. by removing the heat generated by the polymerization, maintaining the polymer content in said reaction mixture at 50% to 80% by weight, continuously withdrawing the resulting polymer-containing reaction mixture from the polymerization zone, separating the polymer in a portion of the withdrawn mixture from the other components wherein fresh polymerization starting material is added to a portion of the polymer-containing liquid withdrawn from the polymerization zone and the mixture so obtained is reintroduced into the polymerization zone.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DETAILED DESCRIPTION OF THE INVENTION AND PREFERRED EMBODIMENTS

Figure 1:
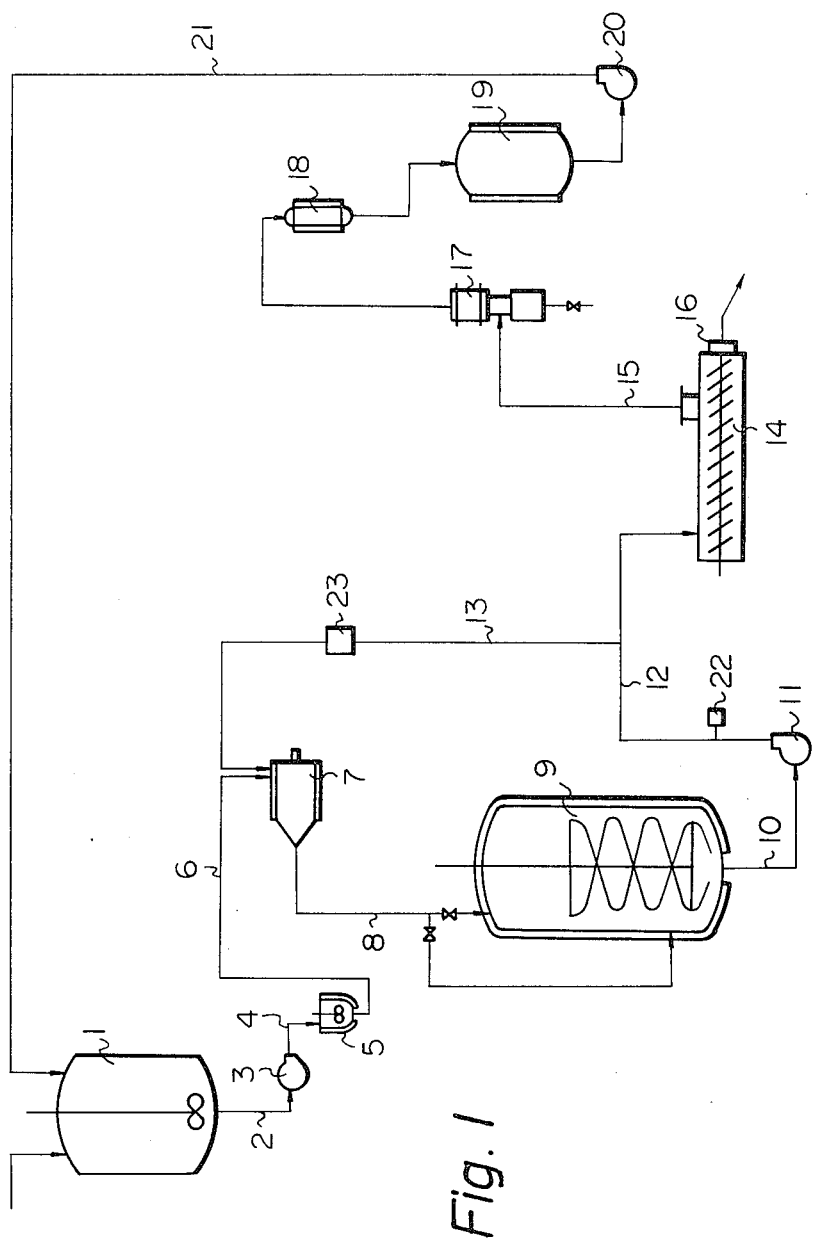
FIG. 1 is a flow diagram illustrating the process of this invention and apparatus useful in practicing this process.

The polymer-containing liquid (polymerization reaction mixture) withdrawn from the polymerization zone and recycled to the starting mixture in the process of this invention is obtained by continuously introducing a polymerization starting material containing at least one vinyl monomer, a polymerization initiator and a polymerization regulator into the polymerization zone and agitating and substantially homogeneously mixing the mixture in the polymerization zone at a temperature of 100° to 200° C. to effect polymerization so that the polymer content in the resulting reaction mixture is 50% to 80% by weight, and this liquid is composed mainly of the formed polymer and the unreacted monomer. If the polymerization is being carried out in solution, this polymer-containing liquid also contains solvent. The stream of polymer-containing liquid withdrawn from the reaction zone is divided and a portion is recycled to the polymerization zone. Aother portion is introduced into a separator, wherein the polymer is separated from the remaining components of the reaction mixture such as unreacted monomer and solvent. The recycled polymer-containing liquid is mixed with fresh polymerization starting material, which material comprises monomer, polymerization initiator, polymerization regulator and other additives, and the resulting mixed starting material is introduced into the polymerization zone to be polymerized.

In the present invention it is preferred that in the mixed starting material the weight ratio of the recycled polymer-containing liquid to the amount of fresh starting material be at least 0.5. If this ratio in the mixed starting material is less than 0.5, the viscosity of the mixed starting material flowing into the polymerization zone is relatively low; consequently, it is not possible to achieve good mixing of the mixed starting material with the polymerization reaction mixture in the polymerization zone, and difficulties such as "short circuit" of the introduced material occur, wherein starting material is withdrawn before it is mixed with the reaction mixture. On the other hand, if the ratio exceeds 30, it is necessary to use complex and larger scale apparatus. Therefore, the ratio is preferably kept between 0.5 to 10.

Vinyl monomers are used as the monomer to be polymerized in the process of the present invention. Methyl methacrylate alone or a mixture of at least 80% by weight of methyl methacrylate with less than 20% by weight of other vinyl compounds copolymerizable with methyl methacrylate is especially preferred. The type of such copolymerizable vinyl compound is not particularly critical. For example, an alkyl acrylate having 1 to 18 carbon atoms in the alkyl group or an alkyl methacrylate having 2 to 18 carbon atoms in the alkyl group may be advantageously used. Other vinyl monomers that can be used in the present invention include styrene by itself or a mixture of styrene with methyl methacrylate, an alkyl acrylate or acrylonitrile. In the process of the present invention, two or more of vinyl monomers can be copolymerized. Methyl methacrylate alone or a monomeric mixture of methyl methacrylate with an alkyl acrylate selected from methyl acrylate, ethyl acrylate and butyl acrylate is especially preferred. The amount of acrylonitrile to be copolymerized with styrene is preferably 5 to 35% by weight.

Suitable polymerization initiators useful in the present invention include, for example, organic peroxides such as di-tertbutyl peroxide, dicumyl peroxide, di-tert-butyl perphthalate, methylethylketone peroxide, di-tert-butyl perbenzoate, tert-butyl peracetate, 2,5-dimethyl-2,5-di(tert-butylperoxyl)hexane, and azo compounds such as azobisisobutanol diacetate, 1,1-azobiscyclohexane carbonitrile, 2-phenylazo-2,4-dimethyl-4-methoxyvaleronitrile and 2-cyano-2-propylazoformamide. These polymerization initiators may be used singly or in the form of a mixture of two or more of them. The amount of the polymerization initiator is $0.1 \times 10^{-4}$ to $1 \times 10^{-4}$ mole per 100 g of the monomer feed, and it is preferred that the amount of the polymerization initiator be in the range defined by the triangular coordinate shown in FIG. 1 of U.S. Pat. No. 3,900,453 (Japanese Patent Publication No. 32665/77).

Suitable polymerization regulators useful in the present invention include, for example, primary, secondary and tertiary mercaptans having an alkyl or substituted alkyl group, such as n-butyl mercaptan, isobutyl mercaptan, n-octyl mercaptan, n-dodecyl mercaptan, sec-butyl mercaptan, sec-dodecyl mercaptan and tert-butyl mercaptan, aromatic mercaptans such as phenyl mercaptan, thiocresol and 4-tert-butyl-o-thiocresol, thioglycollic acid and its esters, and mercaptans having 3 to 18 carbon atoms, such as ethylene glycol mercaptan. These mercaptans may be used singly or in the form of a mixture of two or more of them. The mercaptan as the polymerization regulator is used in an amount of 0.01 to 1 mole % based on the monomer feed.

Additives may be used in the present invention so as to impart desired properties to the resulting polymer. For example, there can be used plasticizers such as dioctyl phthalate, dioctyl sebacate, stearyl alcohol, stearic acid and lauryl alcohol, ultraviolet absorbers such as Tinuvin P (manufactured by Ciba-Geigy) and methyl salicylate and pigments. These additives may be added at the polymerization step or the volatile component-separating step or a subsequent step. In many cases, it is preferred that these additives be added after the polymerization step.

In solution polymerization according to the present invention, solvents usually employed in a conventional solution polymerization can be used and the nature of the solvents are not critical for the present process. However, organic solvents having a boiling point of 55° to 250° C. are preferably used. Example of such solvents are benzene, alkylbenzene such as toluene, xylene, ethylbenzene and cumene, methyl ethyl ketone, methyl isobutyrate, methyl α-hydroxyisobutyrate, and ethyl acetate. The solvent is generally contained in an amount of about 5 to 40% by weight, preferably 5 to 30% by weight, in the polymerization starting material.

The polymerization apparatus which is used for practicing the process of this invention is a tank type reaction vessel having an inlet for introducing a polymerization starting material and an outlet for withdrawal of the resulting reaction mixture and also comprises an agitating and mixing device. This agitating device is required to have an agitating capacity sufficient to exert its mixing function throughout the polymerization zone. It should be noted that a plug flow type reaction vessel having a relatively elongated shape, which is constructed so that the polymerization starting material is fed from one end and the reaction product is withdrawn from the other end without uniform mixing being conducted throughout the polymerization zone (as proposed in U.S. Pat. No. 3,821,330, Japanese Patent Publication No. 4193/73) is not suitable for practicing the process of the present invention.

The polymerization apparatus that is used in the present invention will now be described with reference to the accompanying drawings.

In FIG. 1, reference numeral 1 represents a storage tank for fresh starting material to be polymerized, 2 a pipe, 3 a pump, 4 a pipe, 5 a heat exchanger, 6 a pipe, 7 a mixer, 8 a pipe, 9 a polymerization reactor, 10 a pipe, 11 a pump, 12 a pipe, 13 a pipe, 14 a volatile component separator, 15 a pipe, 16 a die, 17 a heat exchanger, 18 an overall condenser, 19 a storage tank, 20 a pump, 21 a pipe, 22 a viscometer, and 23 represents a heat exchanger.

An embodiment of the process of the present invention will now be described with reference to FIG. 1.

A polymerization starting material comprising a polymerization initiator, a polymerization regulator, a monomer and a solvent in the case of solution polymerization, is fed from a storage tank 1 through pipe 2 and supplied to heat exchanger 5 through pipe 4 by means of pump 3. The heat exchanger 5 is of the closed tank type provided with a coiled cooling jacket and a turbine type agitator. The temperature of the monomer-containing starting material is adjusted in this heat exchanger 5 and it is passed through pipe 6 and mixed with a polymer-containing liquid withdrawn from the polymerization reactor and recycled, in mixer 7 provided with a jacket. The mixture is then conducted through a pipe 8 and introduced into a polymerization reactor 9 at the upper or lower portion thereof. The polymerization reactor 9 is a vessel provided with a spiral ribbon type agitator and a jacket for a cooling medium which is kept at a temperature lower than that of the reaction mixture. The reaction mixture in the polymerization reactor 9 is fed to a volatile component separator 14 through pipe 10, pump 11, viscometer 22 and pipe 12. A part of the reaction mixture, to be recycled, is conducted to heat exchanger 23 through pipes 12 and 13 and returned to the mixer 7, where it is mixed with the fresh starting material. The volatile component which is contained in the reaction mixture fed to the volatile component separator 14 is removed in the volatile component separator 14 and the polymer is withdrawn through die 16. The volatile component separator 14 comprises a screw, a vent hole, heating or cooling means and a pipe for introducing materials under pressure. The volatile component composed mainly of the unreacted monomer (and solvent in the case of solution polymerization), which has been separated from the vent hole, is led to heat exchanger 17 through pipe 15, and after removal of impurities, all of the volatile component vapor is recovered in an overall concentrating condenser 18 and stored in tank 19. The so recovered monomer is recycled to the starting material tank 1 through pump 20 and pipe 21.

Figure 2:
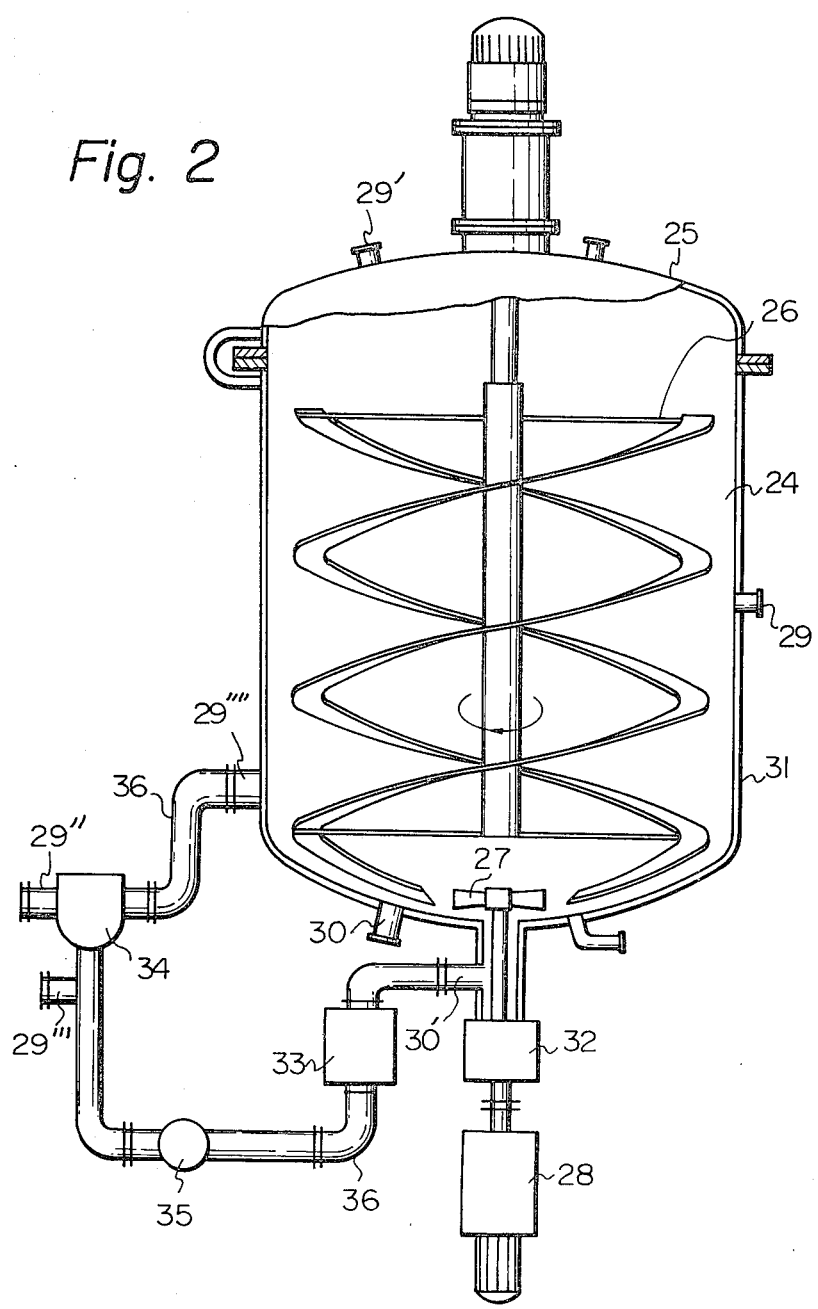
FIG. 2 illustrates a preferred embodiment of the polymerization apparatus useful in practicing the process of this invention.
Figure 3:
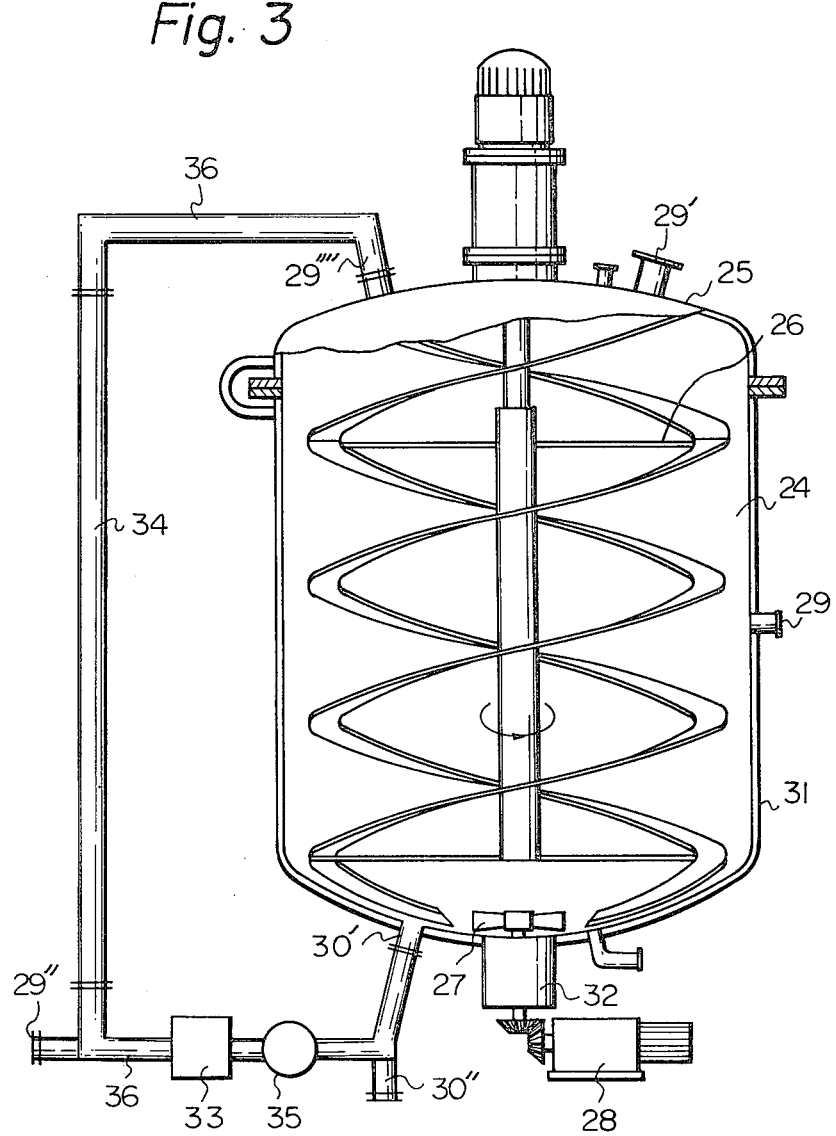
FIG. 3 illustrates another preferred embodiment of the polymerization apparatus useful in practicing the process of this invention.

The polymerization reactor illustrated in FIGS. 2 and 3 comprises a vessel 24 for performing mixing of the starting material and reaction mixture, which vessel includes agitating means 26 disposed in the interior thereof, a take-out opening 30' for withdrawing a part of the reaction mixture from the vessel 24, a pipe 36 attached to said opening 30', liquid mixing means 34 connected to the pipe 36 and a recycling inlet 29'''' for feeding the mixed starting material to the reaction vessel 24.

It is preferred that the inlet for recycling the mixture of reaction mixture and fresh polymerization starting material be located in a position no further from the bottom of the reactor than ¼ of the total height from the bottom to the top of the reactor.

As the agitating means 26, there can be used a spiral vane agitator or a ribbon vane agitator. A rising periphery type spiral vane agitator is preferred.

As the mixing means 34, there can be used a Kenics static mixer, a pipeline agitator (manufactured by Shimazu Seisakusho) or a square mixer (manufactured by Sakura Seisakusho).

One or more recycling inlet 29'''' are formed so that they are arranged in conformity with the flow directions of the liquid in the vessel 24. When a rising periphery type spiral vane agitator is used as the agitating means, it is preferred that the recycling inlet 29'''' be located at a position corresponding to ¼ or less of the total height from the bottom to the top of the vessel 24, because the circulating flow of the liquid caused along the wall in the vessel begins in the vicinity of that position.

In FIGS. 2 and 3, reference numeral 25 represents a cover lid, 27 auxiliary agitating means, 28 a driving motor, 29, 29', 29" and 29''' inlets for introducing fresh starting material to be polymerized, 29'''' an opening for re-introducing mixed starting material, 30 and 30' openings for withdrawal of polymer-containing liquid, 31 a jacket, 32 a shaft seal, 33 a pump, and reference numeral 35 represents a viscometer for measuring the viscosity of the liquid.

Figure 4:
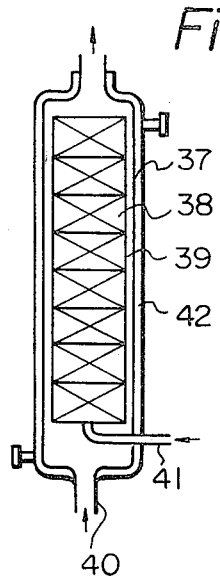
FIGS. 4, 5 and 6 illustrate preferred embodiments of continuous mixing apparatus useful in mixing the recycled portion of the reaction mixture with the fresh polymerization starting material.
Figure 5:
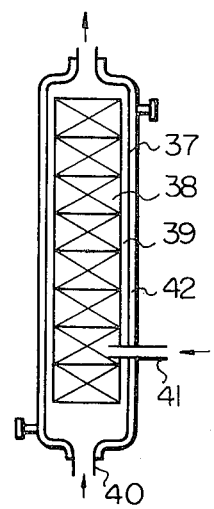
Figure 6:
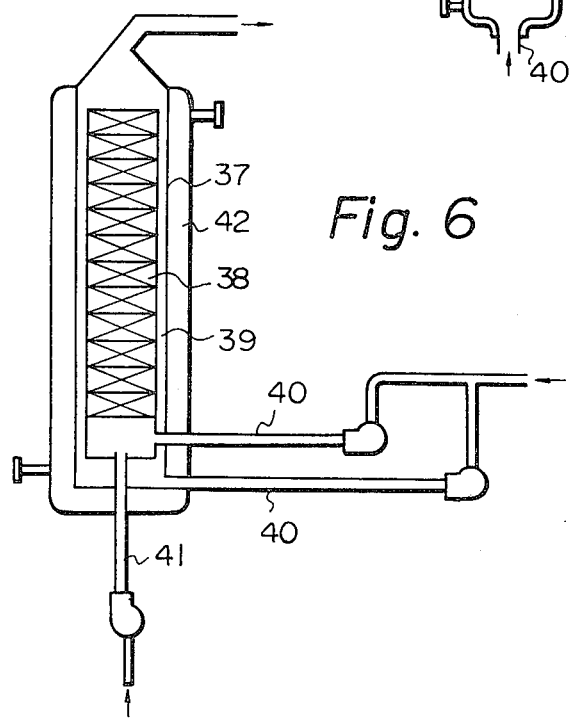

FIGS. 4 to 6 illustrate the structure of mixing means 34. In these mixing devices, elements 38 are disposed in a circular or square tube 37, and these devices are especially designed so that fluids of different temperatures are homogeneously mixed. More specifically, a feed pipe for a low-temperature fluid is directly connected to the elements 38, and a space 39 for introduction of a high-temperature fluid is defined by the tube 37 and the elements 38. Reference numeral 42 designates a jacket for a heating medium.

In these mixing devices, a low-temperature fluid is fed from feed pipe 41 directly connected to a fluid mixing element 38 disposed in the tube 37, and a high-temperature fluid to be mixed with the low-temperature fluid is introduced through a high-temperature fluid feed opening 40 and flows into space 39 defined by the elements 38 and the tube 37. If the two fluids are supplied in this manner, the high-temperature fluid, which has been heated to reduce its viscosity, flows and advances along the inner wall of the tube 37 while the low-temperature fluid is supplied to the element 38 disposed in the tube 37. Accordingly, wasteful loss of heat is avoided and the quantity of heat necessary for heating can be reduced.

The type or shape of the element disposed in the mixing device used in the present invention is not particularly critical. That is, an element of any shape can be used provided that attainment of the objects of the present invention is not inhibited. A corrugated plate-like element, a honeycomb element, an element including a segmented plate and a moving plate and a distorted vane element are preferably employed. As shown in FIG. 4, a plurality of such elements 38 are disposed in the tube 37, and in order to increase mixing, it is preferred that these elements 38 be arranged so that the direction in which the fluid is introduced differs among these elements 38. Furthermore, it is preferred that the width of the space be as large as possible, preferably more than 5 mm.

The fluid mixing device that is preferably used in the present invention has the above-mentioned structure, but modifications or changes may be made to this structure. For example, the mixing device may be designed so that a part of the high-temperature fluid is fed to the elements 38 and mixed with the low-temperature fluid.

According to the present invention, mixing of the polymerization starting material with the polymerization reaction mixture in the polymerization zone can be accomplished promptly and uniformly, and therefore, a polymer having excellent resistant to thermal decomposition and processability can be easily obtained.

Having generally described this invention, a more complete understanding can be obtained by reference to certain specific examples, which are provided herein for purposes of illustration only and are not intended to be limiting unless otherwise specified.

EXAMPLES

In these examples, all parts and percentages are by weight unless otherwise indicated.

In these examples, polymerization was carried out by using the apparatus shown in FIG. 1, the specifications of which were as follows:
Inner volume of polymerization reactor: 300 l
Volatile component separator: twin-screw extruder, 2 screws having a diameter of 90 mm, a total length of 1200 mm, and a vent portion length of 600 mm.

The heat distortion temperature was measured under a fiber stress of 264 psi at a rate temperature increase of 3.6° F./min according to ASTM D-648-56, and the FR value (flow rate value) was determined according to the method specified in ASTM D-1238-65T. The moldability or processability of the polymer was evaluated according to the following procedures.

A given polymer was injection-molded under the following conditions:
Injection molding machine: Model H-35A, plunger type, manufactured by Meiki Seisakusho
Mold capacity: 130 mm×130 mm×2 mm (providing two molded articles)
Injection pressure: 1200° kg/cm$^2$G
Mold filling speed: 4 sec/stroke
Cycle: 65 seconds The operation was repeated at various barrel temperatures, and the upper limit barrel temperature $T_2$, that is the highest temperature at which fewer than 20% of the molded articles had visible defects such as silver streaks or flushes, was determined.

EXAMPLE 1

A fresh polymerization starting material comprising 87 parts of methyl methacrylate, 13 parts of methyl acrylate, 0.24 part of n-octyl mercaptan and 0.0017 part of di-tert-butyl peroxide was prepared under a nitrogen atmosphere and was continuously introduced at a feed rate of 25 liters per hour into the lower portion of a polymerization reactor, after the temperature had been adjusted by a passage through a heat exchanger. The interior of the polymerization reactor was pressurized with nitrogen so that the inner pressure was 8 kg/cm$^2$ gauge and the polymerization temperature was adjusted to 150° C. A part (15 l/hr) of the reaction mixture withdrawn from the polymerization reactor was mixed with fresh polymerization starting material and recycled to the polymerization reactor so that the total mixed starting material was introduced at a feed rate of 40 l/hr. Thus, the initial operation was converted to the steady state operation. The agitation rate was adjusted to 50 rpm to produce sufficient mixing. The residence time was adjusted to 4.5 hours. In the vent extruder, the vent portion, the extruding portion and the die portion were maintained at 250° C., 280° C. and 225° C., respectively, and the vacuum in the vent portion was 9 mm Hg absolute. The polymer was extruded in strands through a die having 4 circular holes, each having a diameter of ⅛ inch, cooled with water and cut into ¼ inch lengths to form pellets. The polymer content in the reaction mixture to be recycled was about 63%. Under the above-mentioned conditions, the operation was continuously conducted for 150 hours while monitoring the viscosity by means of viscometers. It was found that the fresh starting material and the recycled reaction mixture were uniformly agitated and mixed. The obtained polymer had an FR value of 35 to 40 and a heat distortion temperature of 85° C. Furthermore, the value of $T_2$ was as high as 295° to 300° C. Thus, it was found that the polymer had excellent moldability.

If the above polymerization procedures were repeated in the same manner except that the polymer-containing liquid was not recycled at all, good agitation and satisfactory mixing were not attained even when the agitation rate of the reaction vessel was increased, and it was impossible to increase the polymer content (polymerization ratio).

EXAMPLE 2

By using a starting material comprising 99 parts of methyl methacrylate, 1 part of methyl acrylate, 0.29 part of tert-butyl mercaptan and 0.0017 part of di-tert-butyl peroxide, polymerization was carried out in the same manner as described in Example 1, except that the polymerization temperature was adjusted to 155° C., the residence time after the start of steady state operation was adjusted to 4.1 hours and the amount of the recycled polymer-containing liquid was 20 l/hr. In the vent extruder, the vent portion, the extruding portion and the die portion were maintained at 260° C., 240° C. and 235° C., respectively. The vacuum in the vent portion was adjusted to 9 mm Hg absolute. The polymerization ratio in the reaction mixture just after withdrawal from the polymerization reactor was 65%. Under the above conditions, the polymerization operation was continuously conducted for 200 hours. The degree of mixing in the polymerization reactor was as good as in Example 1. The obtained polymer had a FR value of 7 to 9, a heat distortion temperature of 103° C., and a $T_2$ value of 298° to 303° C. Thus, it was confirmed that the polymer had excellent moldability.

EXAMPLE 3

By using a polymerization starting material comprising 90 parts of methyl methacrylate, 10 parts of methyl acrylate, 0.35 part of tert-butyl mercaptan and 0.0020 part of di-tert-butyl peroxide, polymerization was carried out in the same manner as described in Example 1, except that the polymerization temperature was adjusted to 150° C., the residence time after the start of steady state operation was adjusted to about 4.3 hours and the amount of the recycled polymer-containing liquid was changed as shown in Table 1. The polymerization was conducted for about 150 hours. The results of the experiment are shown in Table 1.

TABLE 1

| Polymer Content (%) in Reaction Mixture | Amount (l/hr) of Recycled Polymer-Containing Liquid | Rotation Rate (rpm) of Main Agitation | Degree of Mixing in Polymerization Reactor |
| --- | --- | --- | --- |
| 52–55 | 0 | 120 | poor mixing |
| 56–58 | 12.5 | 80 | uniform mixing |
| 59–62 | 18.75 | 60 | uniform mixing |
| 64–65 | 20.8 | 55 | uniform mixing |
| 64–65 | 21.8 | 55 | uniform mixing |

EXAMPLE 4

By using a fresh polymerization starting material comprising 76 parts of styrene, 24 parts of acrylonitrile, 0.15 part of tertdodecyl mercaptan and 0.0049 part of di-tert-butyl peroxide, polymerization was carried out in the same manner as described in Example 1, except that the polymerization temperature was adjusted to 145° C., polymer content in the reaction mixture withdrawn from the polymerization tank (reactor) was 52 to 53%, and the amount of the total mixed starting material was 45.8 l/hr.

The polymer thus obtained had a heat distortion temperature of 92.1° C.

If the above polymerization procedure was repeated in the same manner except that the polymer-containing liquid was not recycled at all and polymer content in the reaction mixture withdrawn from the polymerization tank was 51% on the average, the obtained polymer had a heat distortion temperature of 86.7° C.

EXAMPLE 5

Example 1 was repeated with the exception that 0.23 part of n-octyl mercaptan was used and the agitation rate was adjusted to 90 rpm.

The polymer thus obtained had a heat distortion temperature of 89° C. and a value of $T_2$ of 300° to 305° C.

If the above polymerization was repeated in the same manner except that the polymer-containing liquid was not recycled at all, the obtained polymer had a heat distortion temperature of 85° C., and a $T_2$ value of 295° to 300° C.

EXAMPLE 6

Example 3 was repeated under the same conditions except that the polymer content of the reaction mixture was withdrawn from the polymerization reactor was adjusted to about 64 to 65% by weight and the amount of recycled polymer-containing liquid was kept at about 21 l/hr at an agitation rate of 45 or 40 rpm. The degree of mixing in the polymerization reactor was uniform under each condition.

If the above polymerization was repeated in the same manner described above, except that the polymer-containing liquid was not recycled at all, the degree of mixing in the reactor was unsatisfactory even at an agitation rate of 60 rpm.

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. In a process for the preparation of vinyl polymers by bulk or solution polymerization comprising continuously introducing a polymerization starting material containing at least one vinyl monomer, at least one polymerization initiator and at least one polymerization regulator into a polymerization reactor of the complete mixing type, polymerizing the monomer while mixing the contents of the polymerization reactor whereby a reaction mixture containing polymer is formed, keeping the temperature of the reaction mixture at a constant level between 100° and 200° C. by removing the heat of polymerization with cooling means provided inside or outside of the reactor, maintaining the polymer content of said reaction mixture at 50 to 80% by weight, withdrawing a stream of reaction mixture containing polymer from the polymerization reactor, introducing the reaction mixture withdrawn from the polymerization reactor into a separation zone where volatiles are separated from the reaction mixture, said separated volatiles being recycled to be used as a part of the monomer for the polymerization starting material, the improvement which comprises dividing said stream of reaction mixture into a first stream and a second stream, feeding said first stream to said separation zone, continuously mixing fresh polymerization starting material with said second stream and recycling the resulting mixture to said polymerization reactor through an opening located at a position corresponding to ¼ or less of the total height from the bottom to the top of said reactor.

2. The process of claim 1, wherein the weight ratio of said reaction mixture withdrawn from the polymerization reactor to said fresh polymerization starting material is $0.5/_1$ to $10/_1$ in the resulting mixture by mixing said polymerization material and said reaction mixture.

3. The process of claim 1, wherein said vinyl monomer is methyl methacrylate.

4. The process of claim 1, wherein said vinyl monomer is a mixture comprising at least 80% by weight of methyl methacrylate and less than 20% by weight of an acrylate ester or methacrylate ester selected from the group consisting of alkyl acrylates having 1–18 carbon atoms in the alkyl group and alkyl methacrylates having 2 to 18 carbon atoms in the alkyl group.

5. The process of claim 1, wherein said vinyl monomer is a mixture comprising at least 65% by weight of styrene and less than 35% by weight of acrylonitrile.

* * * * *